(12) United States Patent
Moon (10) Patent No.: US 7,007,061 B1
(45) Date of Patent: Feb. 28, 2006

(54) COMMUNICATING DATA USING FACSIMILE PROTOCOLS

(75) Inventor: Billy G. Moon, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 936 days.

(21) Appl. No.: 09/632,671

(22) Filed: Aug. 7, 2000

(51) Int. Cl.
G06F 15/16 (2006.01)
H04M 11/00 (2006.01)

(52) U.S. Cl. ................. 709/203; 709/236; 379/100.06; 379/100.15

(58) Field of Classification Search ........... 379/100.15, 379/100.06, 88.13, 88.14, 88.22, 88.23; 358/442, 358/435, 468, 1.15, 434, 379; 340/438; 370/328; 455/555; 701/37; 709/203, 236
See application file for complete search history.

(56) References Cited

U.S. PATENT DOCUMENTS

| | | | |
|---|---|---|---|
| 5,301,186 A * | 4/1994 | Galuszka et al. | 370/216 |
| 5,635,693 A * | 6/1997 | Benson et al. | 340/10.33 |
| 5,673,190 A * | 9/1997 | Kahleck et al. | 700/2 |
| 5,854,830 A * | 12/1998 | Kenmochi | 379/100.15 |
| 5,877,872 A * | 3/1999 | Nomura et al. | 358/468 |
| 5,956,691 A | 9/1999 | Power | 705/4 |
| 6,055,441 A | 4/2000 | Wieand et al. | 455/557 |
| 6,057,943 A * | 5/2000 | Kweon et al. | 358/435 |
| 6,104,505 A * | 8/2000 | Malik | 358/434 |
| 6,160,639 A * | 12/2000 | Lutgen et al. | 358/442 |
| 6,230,024 B1 | 5/2001 | Wang et al. | 455/557 |
| 6,249,811 B1 * | 6/2001 | Kido | 709/219 |
| 6,278,532 B1 * | 8/2001 | Heimendinger et al. | 358/442 |
| 6,330,499 B1 * | 12/2001 | Chou et al. | 701/33 |
| 6,360,095 B1 * | 3/2002 | Cunningham et al. | 455/433 |
| 6,362,730 B1 * | 3/2002 | Razavi et al. | 340/438 |
| 6,389,337 B1 | 5/2002 | Kolls | 701/29 |
| 6,418,324 B1 | 7/2002 | Doviak et al. | 455/556 |
| 6,434,125 B1 * | 8/2002 | Marks et al. | 370/328 |
| 6,487,197 B1 * | 11/2002 | Elliott | 370/354 |
| 6,487,201 B1 | 11/2002 | Seo | 370/394 |
| 6,498,836 B1 * | 12/2002 | Kenmochi | 379/100.06 |
| 6,535,303 B1 * | 3/2003 | Wolf | 358/434 |
| 6,571,109 B1 * | 5/2003 | Kim | 455/555 |
| 6,615,186 B1 | 9/2003 | Kolls | 705/26 |
| 6,633,848 B1 | 10/2003 | Johnson et al. | 704/277 |

FOREIGN PATENT DOCUMENTS

| | | | |
|---|---|---|---|
| JP | 11088591 A | * | 3/1999 |
| JP | 2000029801 A | * | 1/2000 |
| WO | WO 97/26753 | * | 7/1997 |

OTHER PUBLICATIONS

Bhagwat et al, BlueSky: A Cordless Networking Solution for Palmtop Computers, 1999, ACM, pp. 69-76.*

(Continued)

*Primary Examiner*—John Follansbee
*Assistant Examiner*—Kenny Lin
(74) *Attorney, Agent, or Firm*—Baker Botts L.L.P.

(57) ABSTRACT

A communications apparatus establishes a link with a remote location, negotiates a facsimile communications session with the remote location, encapsulates point-to-point protocol (PPP) data as a facsimile page transmission, and transmits the page to the remote location. The communications apparatus may also receive PPP data encapsulated in a page transmission acknowledgment from the remote location. Moreover, the communications apparatus and the remote location may switch between voice and data communications using facsimile communications protocols.

26 Claims, 3 Drawing Sheets

OTHER PUBLICATIONS

Harlow, Building an ISP Using Linux and an Intranet, Sep. 1997, Linux Journal, Article No. 12.*

Lesser et al, The UMASS Intelligent Home Project, 1999, ACM, pp. 291-298.*

Simpon, W., RFC 1661-The Point-to-Point Protocol (PPP), Jul. 1994, Network Working Group.*

TIA/EIA-136-350-C; TDMA Third Generation Wireless—Data Service Control; 434 pp., Approved: Apr. 15, 2002.

TIA/EIA-136-310-A; TDMA Third Generation Wireless Radio Link Protocol—1; 90 pp., Approved: Mar. 31, 2000.

* cited by examiner

COMMUNICATING DATA USING FACSIMILE PROTOCOLS

TECHNICAL FIELD OF THE INVENTION

The present invention relates generally to data communications and more particularly to communicating data using facsimile protocols.

BACKGROUND OF THE INVENTION

Many new vehicles include systems that provide interactive voice and data services. These systems typically include modems for communicating data, such as automobile status information, and include cellular phones for establishing links to call centers. When activated, a typical vehicle services system establishes a data link with a call center and then communicates data to the call center using a modem. After the data have been transmitted, the system may switch the connection to voice mode by dropping out the modem connection. The system's user may then speak with an operator at the call center. However, once the system drops the modem connection, it may be difficult or impossible to re-establish. Thus, all necessary data must be transmitted before switching to a voice session, which may result in significant delays between activating the system and connecting to a live operator. In addition, current digital cellular networks do not support switching between data and voice modes. Therefore, interactive vehicle services systems generally operate using analog cellular systems, which are often less reliable and more expensive than digital systems.

SUMMARY OF THE INVENTION

In accordance with the present invention, techniques for communicating data using facsimile protocols are provided which substantially eliminate or reduce disadvantages and problem associated with previous techniques. In a particular embodiment, the present invention satisfies a need for a system that switches a communications session on a digital cellular network between voice and data communications.

According to one embodiment of the present invention, a communications apparatus includes a client interface that receives point-to-point protocol (PPP) data and a protocol module that encapsulates the PPP data as a payload of a facsimile transmission. The apparatus also includes a network interface that establishes a link with a remote location, negotiates a facsimile communication session with the remote location, and communicates the facsimile page transmission to the remote location. More specifically, the apparatus may establish the link with the remote location using a wireless digital network.

In accordance with another embodiment of the present invention, a method for wireless communications establishes a link with a remote location, negotiates a facsimile communications session with the remote location, encapsulates PPP data as a payload of a facsimile page transmission, and communicates the facsimile page transmission to the remote location. More specifically, the method may establish the link with the remote location using a wireless digital network.

The invention provides a number of technical advantages. These techniques exploit features of many currently deployed digital cellular networks to provide a communications session capable of switching between voice and data communications. Digital cellular networks typically provide a more reliable and less expensive alternative to analog cellular networks. Systems may use these techniques to transmit any point-to-point protocol (PPP) data between two devices connected via a digital cellular network. More specifically, using these techniques, vehicle services systems may operate using digital cellular networks. Users may then switch between communicating data and voice as desired during a communications session. For example, a vehicle services system typically transmits vehicle status information upon connecting to a central call center. The system then switches to voice mode to allow a conversation between a user and an operator at the call center. These systems may operate using digital cellular networks, using facsimile protocols to switch between voice and data communications.

Other technical advantages of the present invention will be readily apparent to one skilled in the art from the following figures, descriptions, and claims.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF EXEMPLARY EMBODIMENTS

Figure 1:
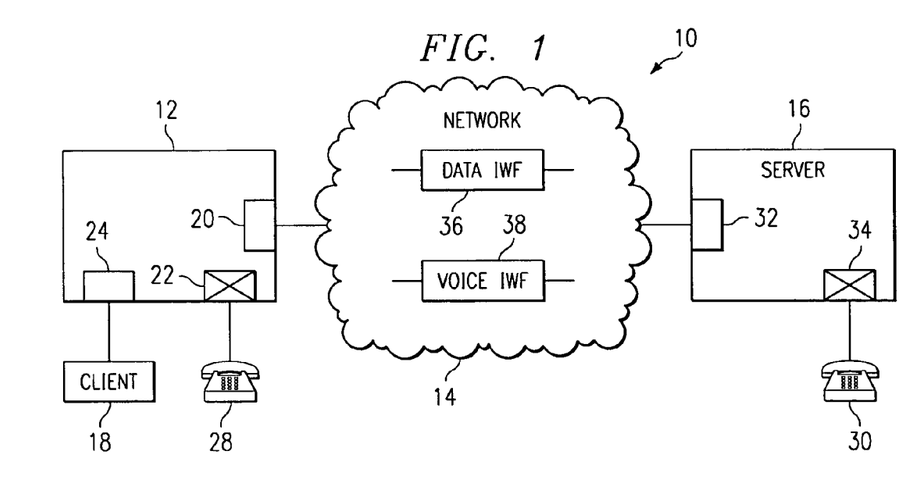
FIG. 1 illustrates a system including devices for communicating data using facsimile protocols.

FIG. 1 illustrates a system, indicated generally at 10, that includes a communications apparatus 12, a network 14, a server 16, and a client 18. In general, apparatus 12 negotiates a facsimile communications session with server 16 via network 14 and communicates data to server 16 by encapsulating the data as a payload for a facsimile page transmission. More specifically, apparatus 12 may communicate point-to-point protocol (PPP) data as the payload of the facsimile page transmission. For example, apparatus 12 and server 16 may communicate Internet protocol (IP) traffic using facsimile page transmissions and acknowledgements.

Apparatus 12 includes a network interface 20, a switch 22, and a client interface 24. Network interface 20 couples apparatus 12 to network 14, switch 22 couples apparatus 12 to a user input/output (I/O) device 28, and client interface 24 couples apparatus 12 to client 18. Apparatus 12 may link to client 18, user I/O device 28, and network 14 using any suitable wireless or wireline communications technology. Apparatus 12 represents hardware and/or software that provides voice and data communications with remote devices and may communicate voice and data using facsimile protocols. Similarly, server 16 represents hardware and/or software that provides voice and data communications with remote devices and may communicate voice and data using facsimile protocols. Server 16 includes a server interface 32 that couples to network 14 and a server switch 34 that couples to a server I/O device 30. Server 16 may link to network 14 and server I/O device 30 using any suitable wireless or wireline technology.

In a particular embodiment, apparatus 12 provides a communications link allowing client 18 and user I/O device 28 to establish communications sessions with remote devices. Client 18 represents any equipment or software that produces data for transmission by apparatus 12. In a particular embodiment, client 18 is an element of a vehicle services system that generates data for communication to a central call center. For example, these data could include vehicle location information, crash data, emergency transmissions, or other information. User I/O device 28 and server I/O device 30 each represent hardware and/or software supporting voice input and output for voice communications sessions. Thus, for example, these devices 28 and 30 may support a voice communications session between a user at client 18 and an operator at server 16. In a particular embodiment, apparatus 12, client 18, and user I/O device 28 represent elements of a vehicle services system providing interactive data and voice communications with a central call center. While this example illustrates a client/server model, system 10 contemplates these elements interacting using peer-to-peer, client/server, or other suitable protocols for communicating via network 14.

Network 14 represents any collection and arrangement of hardware and/or software that communicates information between multiple devices. For example, network 14 may be one or a collection of components associated with the public switched telephone network (PSTN), local area networks (LANs), wide area networks (WANs), a global computer network such as the Internet, or any other communications equipment suitable for providing wireless or wireline communications. In a particular embodiment, network 14 includes components of a digital cellular network (DCN) providing wireless communications services for apparatus 12. The following descriptions detail the communication of PPP data using facsimile protocols. However, system 10 contemplates using similar techniques for transmitting other data for other protocols, such as serial line Internet Protocol (SLIP), IP, or other suitable data communication protocols.

In operation, apparatus 12 and server 16 communicate PPP data using facsimile communications protocols. PPP data may include information encoded in cells, packets, frames, or any other suitable segmentation of data. During a facsimile communications session, participants switch between communicating facsimile data and voice information using facsimile commands. When communicating over a DCN, facsimile protocols facilitate in-session switching between voice and data communications. That is, elements within the DCN monitor and respond to certain facsimile commands by switching between interpretive modules for data and voice communications. This allows a wireless device coupled to a DCN to provide switching between voice and data communications during a communications session.

To provide appropriate wireless communications, a DCN uses different interpretive units, or interworking functions (IWFs), for voice and data communications. For example, a DCN may use a data IWF 36 for data communications and a voice IWF 38 for voice communications. During a facsimile communications session, the DCN interprets facsimile transmissions using data IWF 36 and voice information using voice IWF 38. The DCN switches between IWFs 36 and 38 by monitoring and responding to certain facsimile commands between participants in the communications session. Thus, apparatus 12 and server 16 exploit switching functions available for a facsimile communications session to communicate voice and data over a digital cellular network. Telecommunication Industry Association (TIA) standards IS-130 and IS-135 provide exemplary guidelines for DCNs that respond to facsimile control commands.

During a facsimile communications session, apparatus 12 and server 16 communicate PPP data, such as IP packets, using facsimile page transmissions and acknowledgements. For example, responsive to a user request, a request or command from client 18, or other suitable condition, apparatus 12 establishes a communications link and negotiate a facsimile communications session with server 16. If network 14 includes a DCN, this negotiation signals the DCN to interpret communications using data IWF 36. Apparatus 12 then encapsulates PPP data as the payload of a facsimile page transmission and transmits the page to server 16 via network 14. Server 16 may then respond with PPP data encapsulated in a facsimile page acknowledgment.

At this point, apparatus 12 and server 16 may switch to voice communications using facsimile control commands. For example, apparatus 12 and server 16 each signal an offhook indication and then provide voice communications using I/O devices 28 and 30. If network 16 includes a DCN, the facsimile control commands switching to voice communications signal the DCN to interpret communications using voice IWF 38. At any point after communicating a facsimile page and receiving an acknowledgment, apparatus 12 may communicate additional PPP data by renegotiating for additional facsimile page transmissions. Therefore, apparatus 12 and server 16 use facsimile communications protocols to switch between voice and data communications over a digital cellular network. In response, the DCN switches between data IWF 36 and voice IWF 38. Moreover, apparatus 12 may use features of facsimile sessions such as binary file transfer mode to increase the effectiveness of communications. Although this example illustrates specific functional components, system 10 contemplates apparatus 12 coupling to any suitable devices and containing appropriate functional elements for communicating voice and data using facsimile transmission protocols.

Figure 2:
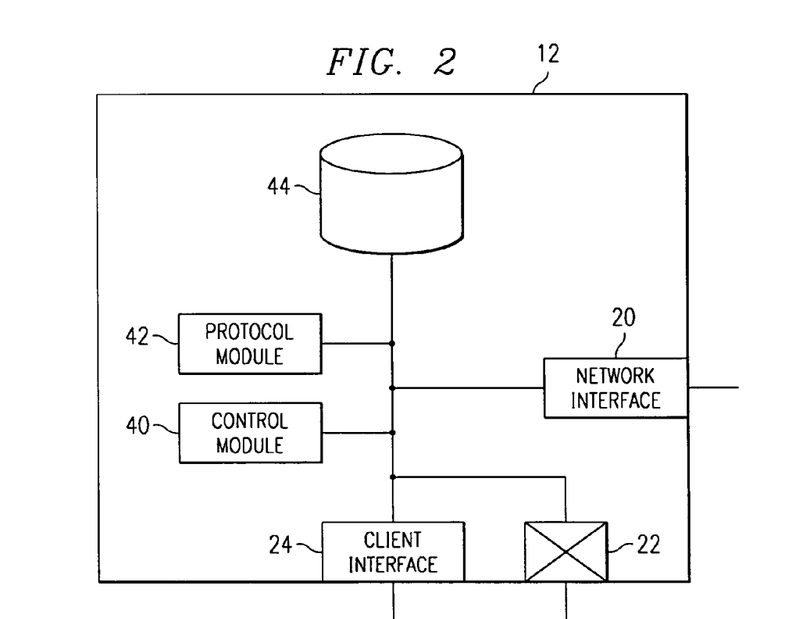
FIG. 2 is a block diagram illustrating functional components of an exemplary device for communicating data using facsimile protocols.

FIG. 2 illustrates an exemplary apparatus 12 having network interface 20, switch 22, client interface 24, a control module 40, a protocol module 42, and a memory 44. In general, client interface 24 receives outbound PPP data, protocol module 42 encapsulates the PPP data as a payload of a facsimile page transmission, and network interface 20 establishes a link with a remote location, negotiates a facsimile communications session with the remote location, and communicates the facsimile page transmission to the remote location.

Network interface 20 couples apparatus 12 to network 14 using any appropriate wireless or wireline communications protocols and supports voice and/or data communications. Network interface 20, alone or in combination with other elements, supports facsimile communications using appropriate commands. In a particular embodiment, network interface 20 also provides wireless communications with a DCN. Client interface 24 couples apparatus 12 to client 18 using any suitable wireless or wireline link and supports the communication of information with client 18 and other devices. In a particular embodiment, client interface 24 couples to vehicle monitoring systems and receives vehicle status information, such as location information or emergency transmissions, for communication to a central call center. Switch 22 links apparatus 12 to user I/O device 28 and enables and disables this link based on the status of voice communications. That is, while voice communications are active, switch 22 enables the link with user I/O device 28 and, during data communications or when voice communications are not active, switch 22 disables the link with user I/O device 28.

Control module 40 controls the operation and administration of elements within apparatus 12. For example, control module 40 may direct communications using network interface 20 and client interface 24 and the operation of elements such as switch 22, protocol module 42, and memory 44. To facilitate facsimile communications, protocol module 42 receives PPP or other data and encapsulates the data as a payload for a facsimile page transmission or a facsimile page acknowledgement. Protocol module 42 may also receive facsimile page transmissions or acknowledgments and extract data from these communications.

Memory 44 represents any one or combination of volatile or non-volatile, local or remote devices suitable for storing data, for example, random access memory (RAM) devices, read only memory (ROM) devices, magnetic storage devices, optical storage devices, or any other suitable data storage devices. Memory 44 may store data for communication to remote devices, data received from remote devices, computer programs for use by apparatus 12, or other suitable information.

In operation, client interface 24 receives PPP data for communication to a—remote location, such as server 16. Protocol module 42 then encapsulates this PPP data as the payload for a facsimile page transmission. Network interface 20 establishes a link and negotiates a facsimile communications session with the remote location and communicates the facsimile page transmission generated by protocol module 42 to the remote location. In response, network interface 20 receives a facsimile page acknowledgment from the remote location. Protocol module 42 extracts any PPP data encapsulated in this page acknowledgment and then forwards this data to client 18 or other devices using client interface 24. To communicate additional PPP data, apparatus 12 may transmit multiple facsimile page transmissions and receive multiple acknowledgements.

Either before or after transmitting data using a facsimile page transmission, apparatus 12 may establish voice communications with the remote location. During voice communications, switch 22 enables the link with user I/O device 28, allowing input and output of voice information. To transmit additional data after establishing a voice session, apparatus 12 disables the link to user I/O device 28 using switch 22 and then renegotiates for an additional facsimile page transmission with server 16. Thus, using facsimile commands, apparatus 12 may switch between data and voice communications at appropriate times during a communications session.

While this example includes specific functional components for apparatus 12, system 10 contemplates apparatus 12 containing any collection and arrangement of components for providing data communications using facsimile communications protocols. Moreover, system 10 contemplates implementing each of the functional components within apparatus 12 using any suitable combination and arrangement of hardware and/or software, and implementing any of the functionalities using a computer program stored on a computer readable medium.

Figure 3:
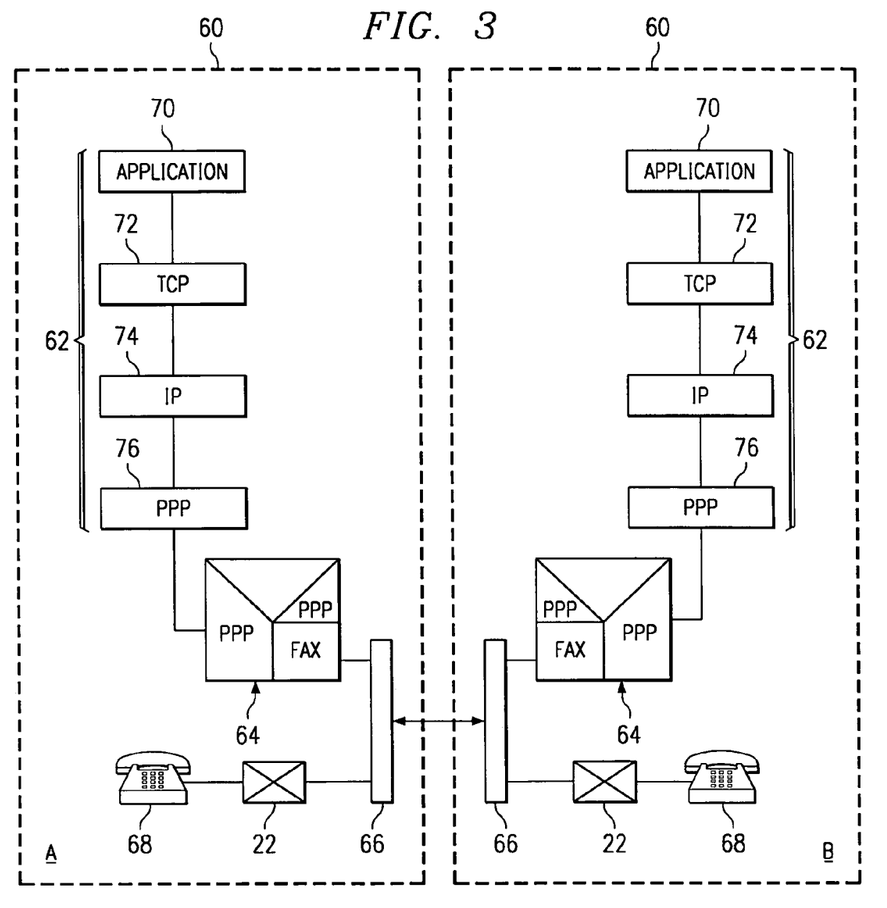
FIG. 3 is a block diagram illustrating various layers for communications protocols and functional elements for the communications devices.

FIG. 3 illustrates a protocol hierarchy in conjunction with selected functional elements of system 10. This example illustrates a communications session between two participants 60 labeled A and B. Each participant 60 includes protocol layers 62, a protocol converter 64, a communications interface 66, switch 22, and a voice interface 68. In general, participants 60 establish a communications link, negotiate a facsimile communications session, and use facsimile protocols to exchange PPP data and to switch to voice communications.

Participants 60 represent hardware and/or software for generating PPP data, communicating this data with remote locations using facsimile protocols, and for communicating voice information. For example, participants 60 may include apparatus 12, client 18, server 16, user I/O device 28, server I/O device 30, or other suitable equipment and/or software. Layers 62 represent a protocol stack that facilitates the communication of information between applications on each participant 60. Layers 62 include an application layer 70, a transmission control protocol (TCP) layer 72, an Internet protocol (IP) layer 74, and a point-to-point protocol (PPP) layer 76. However, while this example includes specific protocol layers 62 and illustrates a TCP/IP stack, system 10 contemplates participants 60 using any suitable protocols and layers for communicating data and voice information.

Protocol converter 64 converts between PPP data and facsimile transmissions. For example, protocol converter 64 may encapsulate outbound PPP data as facsimile page transmissions or acknowledgments, and extract inbound PPP data from facsimile page transmissions or acknowledgments. Protocol converter 64 may be implemented by protocol module 42 or other suitable modules. Communications interface 66 supports voice and/or data communications between participants 60 using any appropriate wireless or wireline communications protocols. For example, communications interface 66 may be network interface 20, server interface 32, or other similar communications equipment. Switch 22, as previously discussed, operates to enable or disable a voice communications link. Thus, switch 22 enables or disables the communications link with voice interface 68. Voice interface 68 represents equipment for receiving voice communications from and communicating voice information to a user. For example, voice interface 68 may be user I/O device 28, server I/O device 30, or other suitable voice communications equipment.

In operation, application layer 70 on A receives or generates data for communication to B. TCP layer 72 and IP layer 74 packetize this data for communication. PPP layer 76 of A then transmits these packets for delivery to PPP layer 76 on B. Protocol converter 64 for A receives these PPP communications and encapsulates the PPP data as a payload for a facsimile page transmission. Communications interface 66 for A then communicates the facsimile page transmission to communications interface 66 of B. Upon receiving the page transmission, protocol converter 64 for B extracts the PPP data and communicates this data through layers 62 of B. Application layer 70 of B may respond with data for communication to A. Protocol converter 64 for B encapsulates the responsive PPP data as a payload for a facsimile page transmission acknowledgment, and communications interface 66 for B transmits the acknowledgement to A.

Participants 60 may also establish a voice communications link between voice interfaces 68. For example, after communicating a facsimile page transmission and acknowledgment, participants 60 each signal an offhook indication, enable voice interfaces 68 using switches 22, and establish a voice communications session between voice interfaces 68. During voice communications, participants 60 may identify additional data for communication. To communicate this data, participants 60 renegotiate facsimile communications and communicate additional facsimile page transmissions and acknowledgments. Thus, participants 60 may switch between voice and data communications.

While this example includes specific protocol layers 62 and functional modules for participants 60, system 10 contemplates using any appropriate protocols and components for communicating voice and data using facsimile communications protocols. Moreover, system 10 contemplates implementing these protocols and functional components using any suitable combination of hardware and/or software, and any of these functionalities may be implemented by a computer program stored on a computer readable medium.

Figure 4:
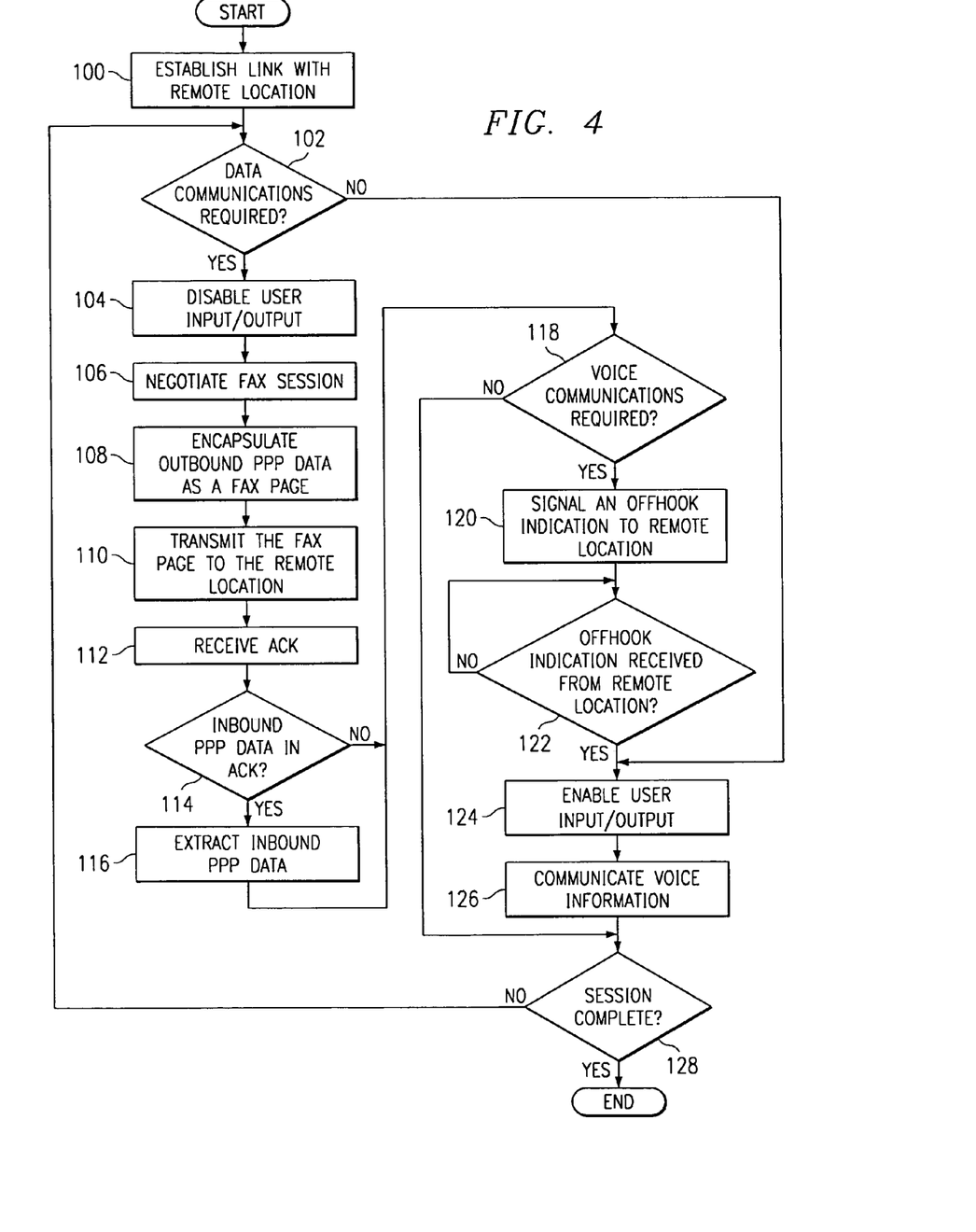
FIG. 4 is a flowchart illustrating a method for communicating data using facsimile protocols.

FIG. 4 is a flowchart illustrating a method for communicating voice and data using facsimile transmission protocols. Apparatus 12 establishes a link with a remote location via network 14 at step 100. As previously discussed, apparatus 12 may use any suitable wireless or wireline communications protocols to establish this link. In a particular embodiment, apparatus 12 communicates via a wireless link with a digital cellular network included in network 14. Apparatus 12 identifies any data for communication to the remote location at step 102. For example, apparatus 12 may determine whether client 18 has generated data for communication to the remote location. If there are no data to be communicated, apparatus 12 may enable a voice communications session at step 124. However, if data for communication are identified, apparatus 12 may ensure that user input and output through user I/O device 28 is disabled at step 104 and negotiate a facsimile communications session with the remote location at step 106. As discussed above, if the communications link with the remote location uses a DCN, these negotiations signal the DCN to use an appropriate interface module, or IWF, for data communications.

Apparatus 12 encapsulates outbound PPP data as the payload of a facsimile page transmission and transmits the facsimile page to the remote location at steps 108 and 110. Apparatus 12 receives a facsimile page acknowledgment at step 112 and determines whether inbound PPP data are encapsulated in the acknowledgment at steps 112 and 114. If not, process flow skips to step 118. However, if apparatus 12 determines that PPP data are encapsulated in the acknowledgment, apparatus 12 may extract the data at step 116.

Apparatus 12 determines whether to establish voice communications at step 118. If not, apparatus 12 determines whether this communications session with the remote location is complete at step 128. However, if a voice communications session has been requested or otherwise indicated, apparatus 12 signals an offhook indication to the remote location at step 120 and awaits the receipt of an offhook indication from the remote location at step 122. After appropriate signaling for voice communications, apparatus 12 enables user I/O device 28 to permit user input and output of voice communications at step 124. Apparatus 12 communicates voice information with the remote location at step 126 and determines whether the session is complete at step 128. If not, apparatus 12 determines whether to initiate additional data communications at step 102. If additional data communications are not currently required, apparatus 12 ensures that user I/O device 28 is enabled and continues the voice communication session at step 126. Thus, the communications session continues, switching between voice and data communications as appropriate, until the communications session is complete.

While this flowchart illustrates an exemplary method, system 10 contemplates using any suitable techniques for communicating data using facsimile transmission protocols. Moreover, many of the steps in this flowchart may take place simultaneously and/or in different orders than as shown. Furthermore, system 10 contemplates using methods with additional steps, fewer steps, or different steps, so long as the methods remain appropriate for communicating data with a remote location using facsimile transmission protocols.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A communications apparatus comprising:
    a client interface operable to receive point-to-point protocol (PPP) data;
    a protocol module operable to encapsulate the PPP data as a payload of a facsimile page transmission; and
    a network interface operable to establish a link with a remote location, to negotiate a facsimile communications session with the remote location, and to communicate the facsimile page transmission to the remote location, the network interface further operable to signal a local offhook indication to the remote location, to receive a remote offhook indication from the remote location, and to communicate voice information with the remote location using the link during the facsimile communications session.

2. The apparatus of claim 1, wherein the network interface is further operable to establish the link with the remote location using a wireless digital network.

3. The apparatus of claim 1, further comprising;
    an audio input device operable to receive outbound voice information from a user;
    an audio output device operable to generate audio output based upon inbound voice information from the remote location; and
    a switch operable to:
        disable the input device and the output device while the interface negotiates the facsimile communications session and communicates the facsimile page transmission; and
        enable the input device and the output device while the interface communicates voice information with the remote location.

4. The apparatus of claim 1, wherein:
    the client interface is further operable to receive additional point-to-point protocol (PPP) data;
    the protocol module is further operable to encapsulate the additional PPP data as a payload of a second facsimile page transmission; and
    the network interface is further operable to negotiate a second facsimile communications session with the remote location and to communicate the second facsimile page transmission to the remote location.

5. The apparatus of claim 1, wherein:
    the network interface is further operable to receive a page transmission acknowledgement, wherein the acknowledgement includes point-to-point protocol (PPP) data; and
    the protocol module is further operable to extract the PPP data from the acknowledgement.

6. The apparatus of claim 1, wherein the PPP data comprise automobile status information.

7. A method for wireless communications comprising:
    establishing a link with a remote location;
    negotiating a facsimile communications session with the remote location;
    encapsulating point-to-point protocol (PPP) data as a payload of a facsimile page transmission;

communicating the facsimile page transmission to the remote location;
signaling a local offhook indication to the remote location;
receiving a remote offhook indication from the remote location; and
communicating voice information with the remote location using the link during the facsimile communications session.

8. The method of claim 7, wherein establishing the link with the remote location comprises establishing the link with the remote location using a wireless digital network.

9. The method of claim 7, further comprising:
negotiating a second facsimile communications session with the remote location;
encapsulating additional PPP data as a payload of a second facsimile page transmission; and
communicating the second facsimile page transmission to the remote location.

10. The method of claim 7, further comprising:
receiving a page transmission acknowledgement, wherein the acknowledgement includes PPP data; and
extracting the PPP data from the acknowledgement.

11. The method of claim 7, wherein the PPP data comprise automobile status information.

12. The method of claim 7, wherein negotiating the facsimile communications session comprises signaling a request for binary file transfer mode.

13. A communications system comprising:
a mobile unit operable to establish a link with a serer using a wireless digital network, to negotiate a facsimile communications session with the server, to encapsulate client point-to-point protocol (PPP) data as a payload of a facsimile page transmission, and to communicate the facsimile page transmission to the server; and
a server operable to receive the facsimile page transmission, to extract the client PPP data, to encapsulate server PPP data as a payload of a page transmission acknowledgement, and to communicate the acknowledgement to the mobile station;
wherein the mobile unit and the server are each operable to signal an offhook indication and communicate voice information using the link during the facsimile communications session.

14. The system of claim 13, further comprising:
an automobile diagnostic module operable to generate automobile status information;
a client coupled to the automobile diagnostic module and to the mobile unit, the client operable to receive the status information from the automobile diagnostic module, to encode the status information as the client PPP data, and to communicate the client PPP data to the mobile unit.

15. Communications software embodied in a computer readable medium and operable to:
establish a link with a remote location;
negotiate a facsimile communications session with the remote location;
encapsulate point-to-point protocol (PPP) data as a payload of a facsimile page transmission;
communicate the facsimile page transmission to the remote location;
signal a local offhook indication to the remote location;
receive a remote offhook indication from the remote location; and
communicate voice information with the remote location using the link during the facsimile communications session.

16. The software of claim 15, further operable to establish the link via a wireless digital network.

17. The software of claim 15, further operable to:
negotiate a second facsimile communications session with the remote location;
encapsulate additional PPP data as a payload of a second facsimile page transmission; and
communicate the second facsimile page transmission to the remote location.

18. The software of claim 15, further operable to:
receive a page transmission acknowledgement, wherein the acknowledgement includes PPP data; and
extract the PPP data from the acknowledgement.

19. The software of claim 15, wherein the PPP data comprise automobile status information.

20. The software of claim 15, further operable to signal a request for binary file transfer mode for the facsimile communications session.

21. A communications apparatus comprising:
means for establishing a link with a remote location;
means for negotiating a facsimile communications session with the remote location;
means for encapsulating point-to-point protocol (PPP) data as a payload of a facsimile page transmission;
means for communicating the facsimile page transmission to the remote location;
means for signaling a local offhook indication to the remote location;
means for receiving a remote offhook indication from the remote location; and
means for communicating voice information with the remote location using the link during the facsimile communications session.

22. The communications apparatus of claim 21, wherein the means for establishing the link with the remote location further comprises means for establishing the link with the remote location using a wireless digital network.

23. The communications apparatus of claim 21, further comprising:
means for negotiating a second facsimile communications session with the remote location;
means for encapsulating additional PPP data as a payload of a second facsimile page transmission; and
means for communicating the second facsimile page transmission to the remote location.

24. The communications apparatus of claim 21, further comprising:
means for receiving a page transmission acknowledgement, wherein the acknowledgement includes PPP data; and
means for extracting the PPP data from the acknowledgement.

25. The communications apparatus of claim 21, wherein the PPP data comprise automobile status information.

26. The communications apparatus of claim 21, wherein the means for negotiating the facsimile communications session further comprises means for signaling a request for binary file transfer mode.

* * * * *

UNITED STATES PATENT AND TRADEMARK OFFICE
CERTIFICATE OF CORRECTION

| | | |
|---|---|---|
| PATENT NO. | : 7,007,061 B1 | Page 1 of 1 |
| APPLICATION NO. | : 09/632671 | |
| DATED | : February 28, 2006 | |
| INVENTOR(S) | : Billy G. Moon | |

It is certified that error appears in the above-identified patent and that said Letters Patent is hereby corrected as shown below:

Column 9, Line 30, after "with a", delete "serer", and insert -- server --.

Signed and Sealed this

Twenty-fourth Day of April, 2007

JON W. DUDAS
*Director of the United States Patent and Trademark Office*